(12) United States Patent
Sun et al.

(10) Patent No.: US 8,608,849 B2
(45) Date of Patent: Dec. 17, 2013

(54) METHOD FOR MAKING ZINC OXIDE NANO-STRUCTRURE

(75) Inventors: Hai-Lin Sun, Beijing (CN); Kai-Li Jiang, Beijing (CN); Qun-Qing Li, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 923 days.

(21) Appl. No.: 12/286,217

(22) Filed: Sep. 29, 2008

(65) Prior Publication Data

US 2009/0255459 A1 Oct. 15, 2009

(30) Foreign Application Priority Data

Apr. 9, 2008 (CN) .......................... 2008 1 0066298

(51) Int. Cl.
*C30B 25/10* (2006.01)
(52) U.S. Cl.
USPC ................... 117/87; 117/84; 117/88; 117/94; 117/95; 117/102; 117/106; 977/762; 977/811
(58) Field of Classification Search
CPC .............................................. F05C 2203/0891
USPC ........... 117/84, 87–88, 94–95, 102, 106, 944; 977/762, 811
See application file for complete search history.

(56) References Cited

U.S. PATENT DOCUMENTS

| 6,831,017 | B1 * | 12/2004 | Li et al. ........................ | 438/694 |
| 2003/0013280 | A1 * | 1/2003 | Yamanaka .................... | 438/487 |
| 2005/0255315 | A1 | 11/2005 | Yamanaka et al. | |
| 2007/0041892 | A1 * | 2/2007 | Park et al. ..................... | 423/622 |
| 2007/0105356 | A1 * | 5/2007 | Wu et al. ....................... | 438/584 |
| 2007/0184975 | A1 | 8/2007 | Yi et al. | |
| 2009/0317943 | A1 | 12/2009 | Park et al. | |

FOREIGN PATENT DOCUMENTS

| JP | 2007-528294 | 10/2007 |
| JP | 2007-290892 | 11/2007 |
| WO | WO2004057064 | 7/2004 |
| WO | WO2008013341 | 1/2008 |

OTHER PUBLICATIONS

Tseng, "Two-step oxygen injection process for growing ZnO nanorods", J. Mater. Res., vol. 18, No. 12, Dec. 2003.*
Fan, "Zinc Oxide Nanostructures: Synthesis and Properties", J Nanoscience and Nanotechnology. Oct. 2005; 5(10):1561-73.*
Tseng, et al. Publication entitled "Two-step oxygen injection process for growing ZnO nanorods," J. Mater. Res., vol. 18, No. 12, pp. 2837-2844 (2003).*

(Continued)

*Primary Examiner* — Michael Kornakov
*Assistant Examiner* — Kenneth A Bratland, Jr.
(74) *Attorney, Agent, or Firm* — Altis Law Group, Inc.

(57) ABSTRACT

A method for making zinc oxide nano-structure, the method includes the following steps. Firstly, providing a growing device, the growing device comprising a heating apparatus and a reacting room. Secondly, providing a growing substrate and forming a metal layer thereon. Thirdly, depositing a catalyst layer on the metal layer. Fourthly, placing the growing substrate into the reacting room together with a quantity of zinc source material. Fifthly, introducing a oxygen-containing gas into the reacting room. Lastly, heating the reacting room to a temperature range of 500~1100° C.

19 Claims, 3 Drawing Sheets

(56) References Cited

OTHER PUBLICATIONS

Fan, et al. Publication entitled "Zinc Oxide Nanostructures: Synthesis and Properties," J. Nanoscience and Nanotechnology, Oct. 2005; 5(10): pp. 1561-1573.*

Mensah, et al. Publication entitled "Formation of single crystalline ZnO nanotubes without catalysts and tempates," Appl. Phys. Lett., vol. 90, p. 113108 (2007).*

Kong, et al. Publication entitled "Catalytic growth of ZnO nanotubes," Materials Chemistry and Physics, vol. 82, pp. 997-1001 (2003).*

Xuan Wang et al., Low-temperature growth and properties of ZnO nanowires, Applied Physics Letters, vol. 84, No. 24, pp. 4941-4943.

Zhang et al., Controlling the Growth Mechanism of ZnO Nanowires by Selecting Catalysts, J. Phys. Chem., V.111, p. 17500-17505, (2007).

* cited by examiner

METHOD FOR MAKING ZINC OXIDE NANO-STRUCTRURE

BACKGROUND

1. Field of the Invention

The present invention relates to methods for making nano materials and, particularly, to a method for making a zinc oxide nano-structure.

2. Discussion of Related Art

Zinc oxide nano materials have been applied in such things as UV (Ultraviolet) laser devices, solar batteries and diluted magnetic semiconductor devices, due to their outstanding mechanical, electrical, and optical properties. Therefore, achieving various zinc oxide nano material structures is desirable.

A conventional method for making a zinc oxide nano material includes the following steps. Firstly, adding ammonia to a zinc chloride solution and adjusting the PH value of the mixture to a range of 9~11. Secondly, putting the mixture into an airtight container and ultrasonically agitating the mixture for 25~35 minutes. Thirdly, placing a clean substrate in the mixture in the airtight container. Fourthly, placing the airtight container in an environment of 80~98° C. for 45~90 minutes. Fifthly, cooling the mixture to room temperature and resting the mixture for 5~9 hours at room temperature. Sixthly, taking the substrate out of the mixture and cleaning it with de-ionized water. Lastly, drying the substrate to obtain a substrate with a layer of zinc oxide nanotubes coated thereon.

However, there are some drawbacks in using this method. Firstly, ammonia and zinc chloride are harmful to the environment. Secondly, it is a time-consuming method. Thirdly, zinc oxide nanotubes made this way have small specific surface areas.

What is needed, therefore, is a method of making the zinc oxide nano-structure that is environmental friendly.

BRIEF DESCRIPTION OF THE DRAWINGS

Many aspects of the present method for making the zinc oxide nano-structure can be better understood with references to the following drawings. The components in the drawings are not necessarily drawn to scale, the emphasis instead being placed upon clearly illustrating the principles of the present method for making the zinc oxide nano-structure.

Figure 1:
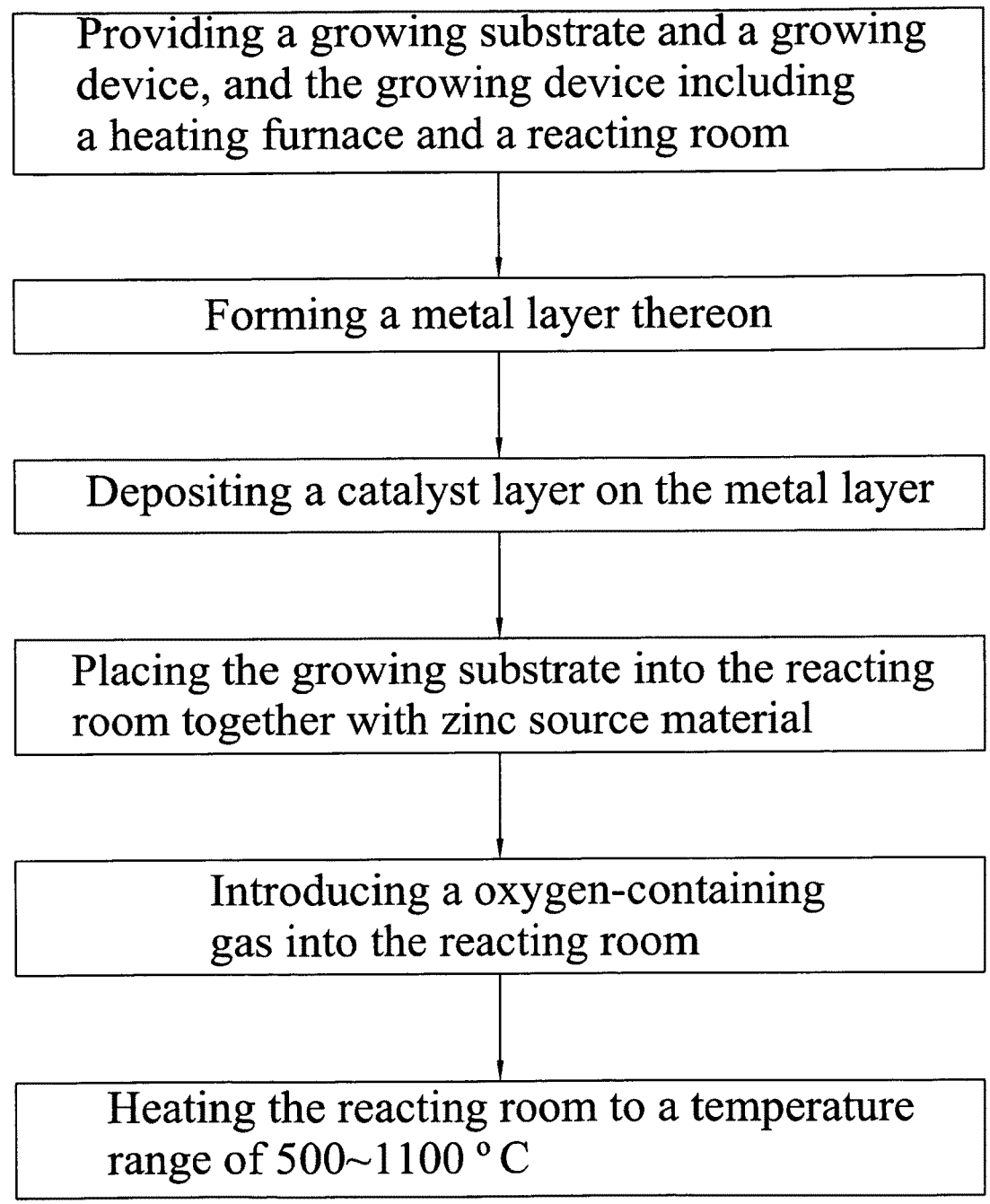
FIG. 1 is a flow chart of a method for making a zinc oxide nano-structure, in accordance with a present embodiment.

Corresponding reference characters indicate corresponding parts throughout the several views. The exemplifications set out herein illustrate at least one embodiment of the present method for making the zinc oxide nano-structure, in at least one form, and such exemplifications are not to be construed as limiting the scope of the invention in any manner.

DETAILED DESCRIPTION

References will now be made to the drawings to describe, in detail, various embodiments of the present method for making a zinc oxide nano-structure.

Figure 2:
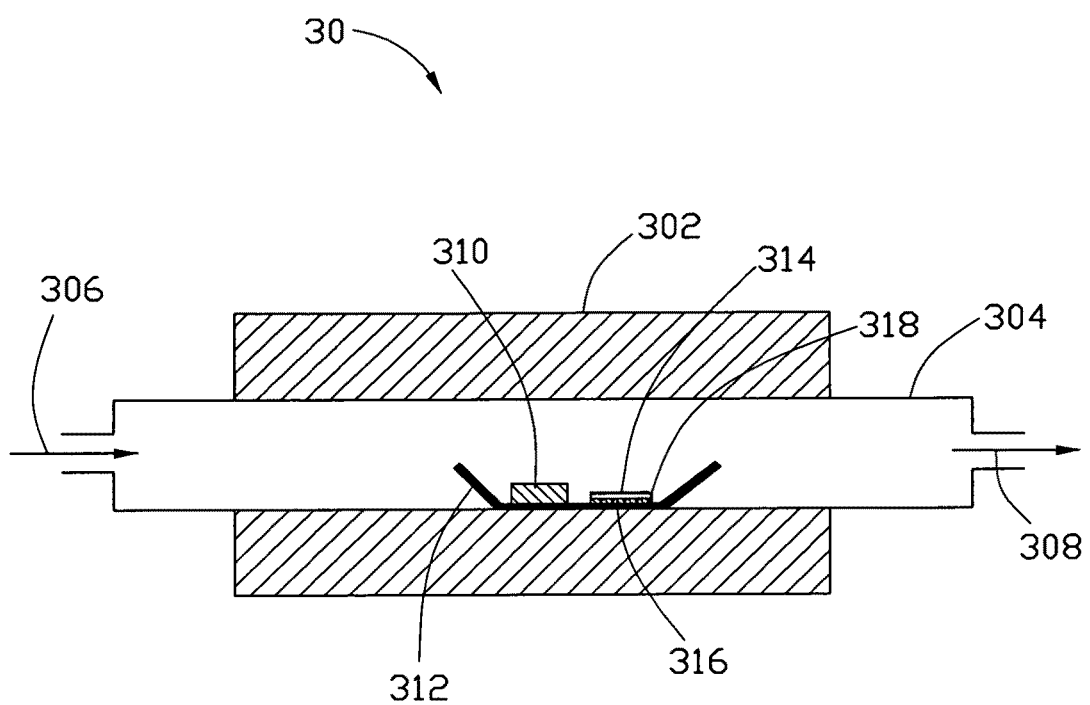
FIG. 2 is a schematic view of a growing device used for making the zinc oxide nano-structure of FIG. 1.

Referring to FIGS. 1 and 2, a method for making the zinc oxide nano-structure includes the following steps: (a) providing a growing substrate 316 and a growing device 30, and the growing device 30 including a heating apparatus 302 and a reacting room 304; (b) forming a metal layer 318 thereon; (c) depositing a catalyst layer 314 on the metal layer 318; (d) placing the growing substrate 316 into the reacting room 304 together with a zinc source material 310; and (e) introducing an oxygen-containing gas into the reacting room 304; and (f) heating the reacting room 304 to a temperature range of 500~1100° C.

In step (a), the reacting room 304 can be a quartz tube with a gas inlet 306 at one end and a gas outlet 308 at an opposite end. The quartz tube is movably located in the heating apparatus 302. The length of the quartz tube is more than the length of the heating apparatus 302 so that part of the tube can be used as handle when moving it while still keeping a substantial part of it heated in the heating apparatus 302.

Moreover, a carrier 312 with a high melting point can be disposed in the reacting room 304. In the present embodiment, the carrier 312 is a ceramic boat. The shape of ceramic boat is arbitrary and the volume of the ceramic boat can be selected according to need.

In step (a), the growing substrate 316 used is made from a non-metallic material with high melting point (e.g. silicon, silicon dioxide, quartz, glass, sapphire, etc). In the present embodiment, the growing substrate 316 is a silicon wafer. The growing substrate 316 is cleaned using ultrasonic vibration before forming a metal layer 318 thereon. The period of time for cleaning the growing substrate 316 ranges from approximately 10 to 30 minutes.

In step (b), the method for forming the metal layer 318 can be selected from the group comprising of chemical vapor deposition (CVD), sputtering, and plasma-assisted chemical vapor deposition et al. Although the choice of the material of the metal layer 318 is arbitrary, purity of the metal layer 318 in the present embodiment is more than 99.9%. The thickness of the metal layer 318 ranges from approximately 0.5 micrometers to 1 millimeter. In the present embodiment, the material of the metal layer 318 is aluminium and the thickness of the metal layer 318 is 1 micrometer.

In step (c), the method for forming the catalyst layer 314 can be selected from the group comprising of chemical vapor deposition (CVD), sputtering, and plasma-assisted chemical vapor deposition et al. The material of the catalyst layer 314 is different from the material of the metal layer 318, such as gold, iron or copper. The thickness of the catalyst layer 314 ranges from approximately 1 to 500 nanometers. In the present embodiment, the catalyst layer 314 is gold film and about 5 nanometers thick. The purity of the gold is more than 99.9%.

In step (d), various forms of zinc can be used as the zinc source material 310 such as zinc blocks or zinc powder, in the present embodiment, a quantity of zinc powder is used. Before placing the zinc source material 310 into the reacting room 304, the zinc source material source material 310 is placed into a diluted acid solution for a period of time (e.g. about 2 to 10 minutes) so as to get rid of the oxide layer and other impurities on the surface of the zinc source material 310. In the present embodiment, the diluted acid solution is diluted hydrochloric acid solution and the purity of the zinc powder is more than 99.9%.

The growing substrate 316 could be placed anywhere in the reacting room 304 as long as one surface of growing substrate 316 can be exposed to the oxygen-containing gas introduced in following step (e). The growing substrate 316 can be placed above the carrier 312 or between the carrier 312 and the gas outlet 308. While the carrier 312 is large enough, the growing substrate 316 can be placed in the carrier 312 together with the zinc source material 310, and the growing substrate 316 is near the gas outlet 308.

Before step (e), an optional step (g) of introducing a protective gas into the reacting room 304 could be carried out. The protective gas is used to evacuate the air in the reacting room 304. In the step (g), the protective gas form a gas flow direction 320 from the gas inlet 306 to the gas outlet 308. The flow rate of the protective gas ranges approximately from 100 to 2000 milliliter per minute. The protective gas is selected from the group comprising of nitrogen ($N_2$) gas and noble gas. In the present embodiment, the protective gas is argon (Ar) gas.

In step (e), the oxygen-containing gas is introduced into the reacting room 304 after the air in the reacting room 304 being evacuated entirely. The protective gas is still added during the introduction of the oxygen-containing gas. The air pressure in the reacting room 304 ranges approximately from 1 to 50 torrs. In the present embodiment, the oxygen-containing gas is oxygen gas. The purity of the oxygen gas is more than 99.99%. The flow rate of the oxygen gas ranges approximately from 20 to 1000 milliliters per minute.

In step (f), the reacting temperature ranges approximately from 500 to 1100° C. The period of time for growing the zinc oxide nano-structure ranges approximately from 10 to 90 minutes. The melting point of the zinc source material 310 of the present embodiment is 419.5° C. While the reacting room 304 is heated to a temperature in the approximate range from 500 to 1100° C., all of the zinc source material 310 melts and begins to vaporize. In a gaseous state, the zinc reacts with the oxygen gas under the action of the catalyst to fabricate zinc oxide nano-structure on the growing substrate 316. It is to be understood that the process of introducing the oxygen gas into the reacting room 304 could be carried out after heating the reacting room 304 to the reacting temperature or at the same time as heating the reacting room 304.

Figure 3:
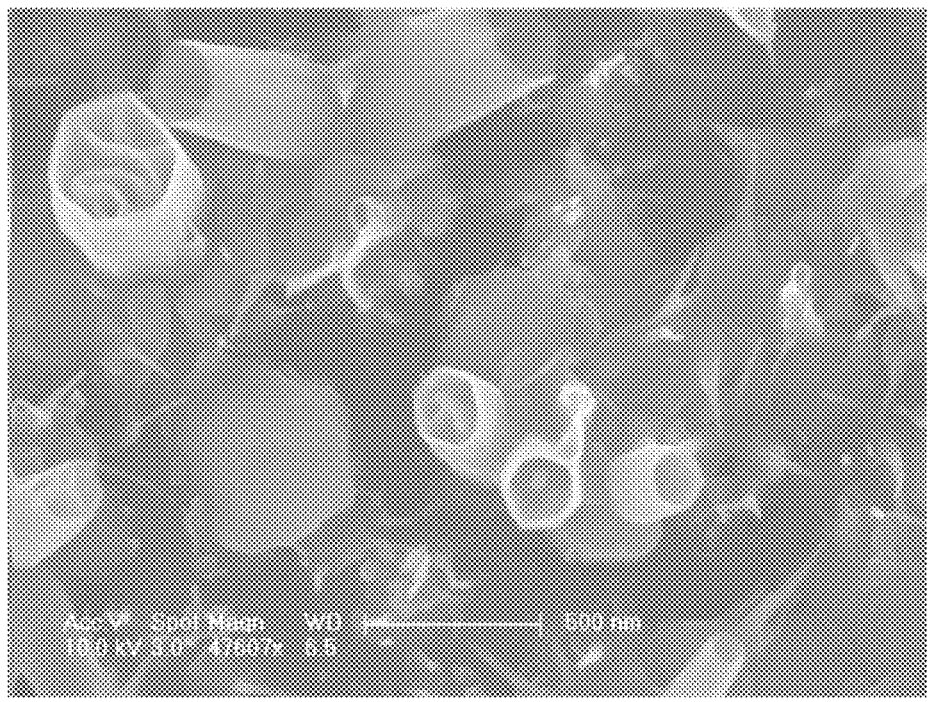
FIG. 3 is a Scanning Electron Microscope (SEM) image of the zinc oxide nano-structure formed by the method of FIG. 1.

In the present embodiment, the metal layer 318 is aluminium film and the catalyst layer 314 is gold film. The zinc oxide nano-structure is grown at 1000° C. Referring to FIG. 3, the zinc oxide nano-structure includes a plurality of zinc oxide nanotubes. Each zinc oxide nanotube includes a plurality of zinc oxide nano films therein. The surfaces of the zinc oxide nano films extend along the zinc oxide nanotube. The space in the zinc oxide nanotube is divided by the zinc oxide nano films joined together. The cross section of the zinc oxide nanotube is hexagon. A diameter of the zinc oxide nanotubes ranges approximately from 50 nanometers to 1 micrometer. A length of the zinc oxide nanotubes ranges approximately from 100 nanometers to 100 micrometers. The zinc oxide nano-structure has large specific surface due to it includes a plurality of zinc oxide nanotubes and each zinc oxide nanotube includes a plurality of zinc oxide nano films therein. Therefore, the zinc oxide nano-structure fabricated in present embodiment could be used as an excellent gas sensitive material.

The present method for making the zinc oxide nano-structure has the many advantages including the following. Firstly, zinc and oxygen-containing gas used as source materials are environmental friendly. Secondly, the method for making the zinc oxide nano-structure has simple fabrication procedure and is easy to be achieved. Thirdly, the zinc oxide nano-structure fabricated by above-described method has large specific surface and could be used as an excellent gas sensitive material.

Finally, it is to be understood that the above-described embodiments are intended to illustrate, rather than limit, the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A method for making zinc oxide nano-structure, the method comprising the following steps of:
    (a) providing a growing substrate and a growing device, the growing device comprising a heating apparatus and a reacting room therein;
    (b) forming a metal layer on the growing substrate, the metal layer having a thickness capable of growing a plurality of zinc oxide nanotubes having open ends, and each of the plurality of zinc oxide nanotubes having a hollow center;
    (c) depositing a catalyst layer on the metal layer;
    (d) placing the growing substrate together with a zinc source material into the reacting room;
    (e) introducing an oxygen-containing gas into the reacting room;
    (f) heating the reacting room to a temperature in a range from 500° C. to 1100° C.; and
    (f1) growing a zinc oxide nano-structure comprising the plurality of zinc oxide nanotubes having open ends.

2. The method as claimed in claim 1, wherein the growing substrate is selected from the group consisting of silicon, silicon dioxide, quartz, glass, and sapphire.

3. The method as claimed in claim 1, wherein the thickness of the metal layer ranges from 0.5 micrometers to 1 millimeter.

4. The method as claimed in claim 1, wherein the metal layer is an aluminum film.

5. The method as claimed in claim 1, wherein a thickness of the catalyst layer ranges from 1 nanometer to 500 nanometers.

6. The method as claimed in claim 5, wherein the catalyst layer is a gold film.

7. The method as claimed in claim 1, wherein the reacting room comprises a gas inlet and a gas outlet, and the growing substrate is placed between the zinc source material and the gas outlet.

8. The method as claimed in claim 1, wherein the growing substrate is placed above the zinc source material.

9. The method as claimed in claim 1, further comprising a step (g); step (g) comprises introducing a protective gas into the reacting room before step (e).

10. The method as claimed in claim 9, wherein in step (g) the air pressure in the reacting room ranges from 1 torr to 50 torrs.

11. The method as claimed in claim 9, wherein a flow rate of the protective gas ranges from 100 milliliter per minute to 2000 milliliter per minute.

12. The method as claimed in claim 1, wherein time for growing the zinc oxide nano-structure ranges from 10 minutes to 90 minutes.

13. The method as claimed in claim 1, wherein a flow rate of the oxygen gas ranges from 20 milliliter per minute to 1000 milliliter per minute.

14. The method as claimed in claim 1, wherein the zinc source material is in a form of zinc powder or a zinc block.

15. The method as claimed in claim 1, wherein the plurality of zinc oxide nanotubes comprise a zinc oxide film located in the hollow center of the plurality of zinc oxide nanotubes, and the zinc oxide film extends along a length direction of the plurality of zinc oxide nanotubes.

16. The method as claimed in claim 15, wherein the plurality of zinc oxide films are joined together.

17. The method as claimed in claim 16, wherein the reacting room is heated to the temperature of 1000° C. to 1100° C.

18. A zinc oxide nanotubes growing method, comprising:
   forming a metal layer on a substrate to a thickness sustainable of growing zinc oxide nanotubes which are hollow centered and open ended;
   depositing a catalyst layer on the metal layer, wherein the catalyst layer is configured to grow the zinc oxide nanotubes;
   placing the substrate and a zinc metal into a reacting room;
   introducing an oxygen-containing gas into the reacting room;
   heating the reacting room to a temperature in a range from 500° C. to 1100° C.; and
   growing the zinc oxide nanotubes which are hollow centered and open ended on the catalyst layer.

19. A zinc oxide nanotubes growing method, comprising:
   forming a metal layer on a substrate to a thickness sustainable of growing zinc oxide nanotubes which are hollow centered and open ended;
   depositing a catalyst layer on the metal layer, wherein the catalyst layer is configured to grow the zinc oxide nanotubes;
   placing the substrate and a zinc metal into a reacting room;
   introducing an oxygen-containing gas into the reacting room;
   heating the reacting room to a temperature in a range from 1000° C. to 1100° C.; and
   growing the zinc oxide nanotubes on the catalyst layer at the temperature in a range from 1000° C. to 1100° C., the zinc oxide nanotubes being hollow centered, open ended, and comprising zinc oxide films in hollow centers of the zinc oxide nanotubes, and the zinc oxide films extend along a length direction of the zinc oxide nanotubes.

* * * * *